INVENTOR
GEORGES JACUBOWITZ
by Adams & Bush
ATTORNEYS

Patented Dec. 20, 1949

2,492,045

UNITED STATES PATENT OFFICE 2,492,045

ELECTRONIC IMPULSE SPEED REGULATOR

Georges Jacubowitz, Paris, France, assignor to Compagnie Generale Pour l'Equipement Aeronautique, Paris, France, a French company.

Application February 27, 1948, Serial No. 11,376
In France August 16, 1946

Section 1, Public Law 690, August 8, 1946
Patent expires August 16, 1966

5 Claims. (Cl. 318—309)

My invention relates to motor speed regulators, and in particular to electronic regulators employing photo-electric cells for regulating the speed of electric motors.

An object of my invention is to provide a speed regulator applicable to any motor of which it is desired to provide speed regulation, such as an internal combustion motor, a steam engine, a steam or gas turbine, a Diesel-electric motor, or motors of other types, or any other machine whose speed is controllable and for whose satisfactory operation it is necessary to have constant speed.

According to my invention, on a shaft driven by the motor or the machine to be controlled, there is keyed a device permitting on each revolution, or portion of a revolution, to produce an electric impulse, this electric impulse is displaced or dephased in time by suitable means and is used to operate a "too low speed" relay, or a "too high speed" relay, according as this electric impulse arrives ahead of, or behind, or in exact synchronism with a set of shutters or similar members, driven by the motor shaft and consequently locked in with the individual speed of the motor to be regulated. It will be apparent that this electric impulse so displaced in time may also be utilized to control any control device other than a relay. Thus, electric gates or shutters, or automatic or other clutches, may be so regulated or controlled.

The "too-low speed" relay and the "too-high speed" relay can be employed to control the admission to a carburetor or the admission of steam, or to control an electric rheostat, or the pitch setting of airplane propellers, or for any other control. If desired, the control can be made directly without using any intermediate relay. For the purposes of control, there can also be substituted for the actuating winding of a relay, the controlling winding of an electric gate or shutter, for example, or any other similar electric apparatus.

In most of the embodiments of the present invention, the shutters are used in combination with a source of light, an optical lens system, and photo-electric cells.

In a modified form of the present invention, the device permitting obtaining an impulse spaced in time by an adjustable interval, according to the speed of the motor to be controlled, is characterized by the fact that it comprises an assembly preferably including an alternating current generator driven by the drive shaft of the motor to be controlled, and having its output connected to a suitable oscillating circuit, and by any desired group of amplifiers designed to send the electric impulse properly spaced in time to a discharge lamp which ignites without inertia, and is positioned between the elements of the optical system and on its axis. This optical system is arranged between shutters which are suitably cut and contoured and are fixedly mounted on the control shaft of the motor.

The light impulse, or ray of light, coming from the discharge lamp, is directed onto a photoelectric cell, if at this moment the shutter is open, and this photo-electric cell converts the light impulse into an electric impulse which is amplified by an individual amplifier and controlling an individual relay corresponding to that particular photo-electric cell.

My invention will be understood from the following specification and the accompanying drawings, wherein corresponding parts are represented by the same characters of reference in the several figures showing several different embodiments of the invention, and wherein.

Figure 1:
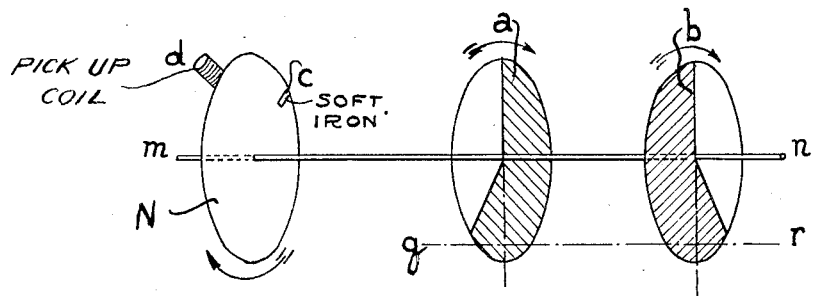
Fig. 1 shows diagrammatically the motor drive shaft fixedly carrying the two shutters and the electro-magnetic pick-up.
Figure 2:
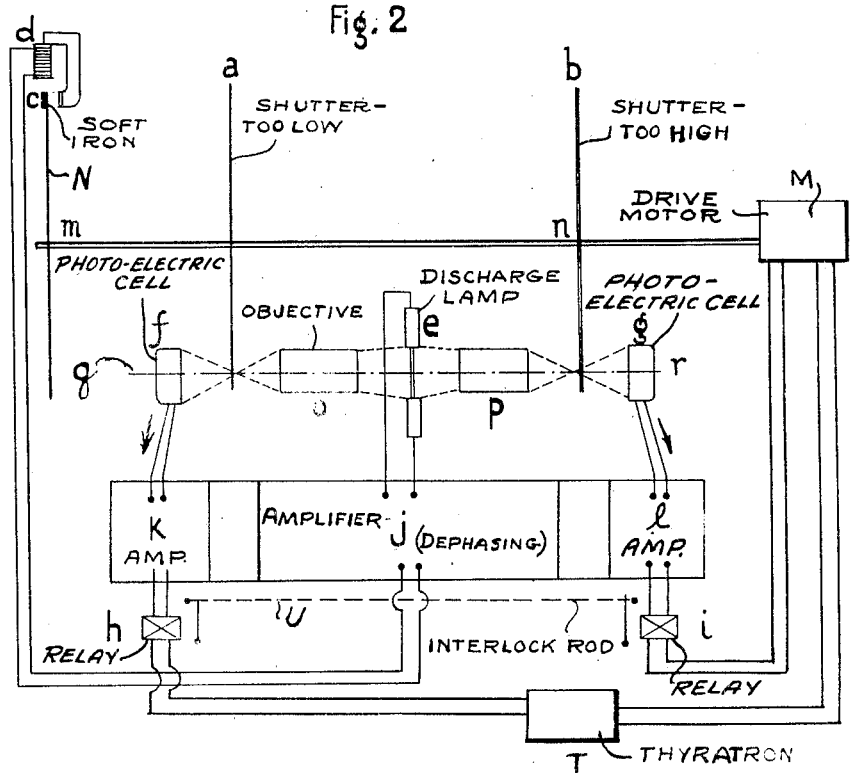
Fig. 2 shows the motor drive shaft carrying the shutters and electro-magnetic pick-up, together with the discharge lamp, optical system, amplifiers and output relays for lowering or raising the speed of the motor.
Figure 3:
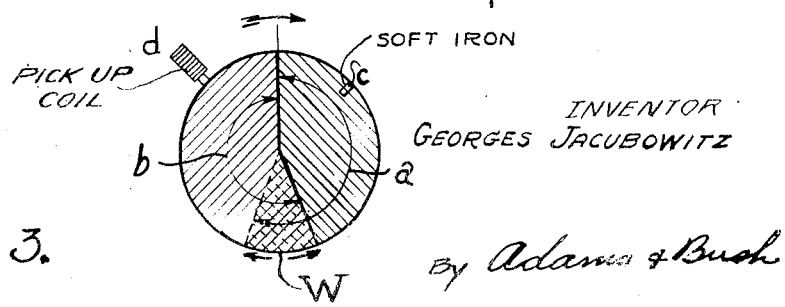
Fig. 3 shows the angular orientation on the motor shaft of the opaque sectors of the shutters and their overlap, and also the angular orientation on the shaft of the electro-magnetic pick-up means.

Referring to the figures in detail, in the embodiment shown in Fig. 2, of which details are shown in Figs. 1 and 3, the drive shaft $mn$ driven by the motor to be controlled, fixedly carries two shutters $a$ and $b$, each of which has an opaque sector and an open light transmitting sector. As shown in Fig. 3, the opaque sectors of the two shutters overlap over a narrow sector W shown doubly cross hatched in Fig. 3, which latter overlapping sector corresponds to the operation of the motor at its intended speed.

A non-magnetic disc N fixedly mounted on shaft $mn$ carries on its periphery a small insert of soft iron $c$. A pick-up coil $d$ is mounted adjacent to the periphery of this disc, and once during each rotation of the shaft, generates an impulse of current at the instant when the iron insert $c$ passes by.

The angular positions on shaft $mn$ of the opaque sectors of shutters $a$ and $b$ and of iron insert $c$ are adjusted in such manner as to obtain the desired manner of operation of speed control as hereafter described, so that if the motor is operating at the desired speed, the flash of light generated when iron insert $c$ passes coil $d$ will occur during the passage through the light beams of the overlapping portions of opaque sectors of shutters $a$ and $b$.

The short electric impulse produced in coil $d$ at the instant of the passage adjacent thereto of iron insert $c$, is delivered to the input of an amplifier $j$ which is an input lamp dephasing amplifier and comprises electrical time delay means such as a filter element, so that the incident current impulse is amplified and dephased in time to a determined extent, and the output of this amplifier $j$ is applied to cause an instantaneous flash of the discharge lamp $e$ having inertialess ignition, and which may suitably be a neon lamp.

The time delay means comprised within input lamp dephasing amplifier $j$ is adjusted to have a determined constant time delay to attain the mode of operation hereinafter described, so that the discharge lamp $e$ will emit a short flash of light for each current impulse generated in winding $d$ and with a desired delay interval thereafter.

The first shutter $a$ and its associated elements control the two-low speed circuit. If this first shutter $a$ has not yet arrived at a beam cut-off position between the discharge lamp $e$ and the first photo-electric cell $f$ positioned in alignment therewith, this first photo-electric cell $f$ will have incident thereon a beam from lamp $e$ through objective lens $o$. The impulse of current so generated by first photo-electric cell $f$ will be delivered to a first output amplifier $k$, whose output is, in turn, applied to a first control relay $h$ through a thyratron tube. The first output relay $h$ will thus receive sufficient power to remain blocked during at least one revolution of the shaft.

The thyratron tube will be arranged in such manner that it unblocks itself automatically after each impulse. Hence, the operation is that the first output relay $h$ will remain in closed position so long as the first shutter $a$, that is to say the motor shaft, does not turn fast enough to reach the necessary point to close the shutter $a$ by its opaque sector before the flash of light is produced by lamp $e$.

The second shutter $b$ is arranged in a manner generally similar to that of the first shutter $a$ and, in operation, will have its open sector in the beam path only when the speed of the motor shaft is such that the second shutter $b$ has had time enough to rotate through a sufficiently large angle to expose the second photo-electric cell $g$ to the beam from lamp $e$ passing through objective lens $p$ along optic axis $qr$ when an instantaneous flash is produced in the lamp $e$.

The second photo-electric cell $g$ controls second output amplifier $l$ which is similar to the first output amplifier $k$ of first photo-electric cell $f$. A second control relay $i$ is connected to the output of second amplifier $l$, and will be actuated as soon as the speed of second shutter $b$, and hence of the motor shaft, is such that this second shutter $b$ has had time to rotate around to the space between the instant of the first impulse produced by winding $d$ and the instant of ignition of the discharge lamp $e$, as determined by the time delay means.

The two shutters $a$ and $b$ are adjusted in such manner that, at a given speed, which is the determined regulated speed, both of the two shutters $a$ and $b$ will have their opaque sectors in overlapping position, so that at this instant, neither the first photo-electric cell $f$ nor the second photo-electric cell $g$ can receive any incident light beam from discharge lamp $e$.

The setting of the angle of radial angular spacing between the position of the winding $d$ relative to the motor shaft, and the position of the optical system, will adjust the speed of operation of the motor which is maintained, the overlap of the opaque sectors of the two shutters adjusting the setting of the regulated speed.

The two control relays $h$ and $i$ will be coupled together mechanically by the rod U arranged so that they cannot both remain closed together. These two relays are connected from their respective controlled contacts through suitable elements to respectively increase the motor speed and to decrease the motor speed of the motor whose speed is to be controlled and which drives shaft $mn$.

The system which has been described constitutes a three mode regulation; that is to say, a too-low speed mode, a normal speed mode, and a too-high speed mode. It is apparent that the system can be likewise employed for on-off regulation; that is to say, that in this case, one single relay is sufficient and the system is the same as has been above described, but employs only one photo-electric cell with one output amplifier and one control relay.

In the system which has been described, the same manner of operation can also be obtained if the discharge lamp is replaced by a device which provides for transforming an instantaneous electric impulse into a flash of light; this device could, for example, be a Kerr cell or a mirror galvanometer, or a string galvanometer, or other suitable device.

Any other suitable device for generating the electric impulse can be employed instead of pickup winding $d$ and iron insert $c$, such as an interrupted circuit.

The assembly of the discharge lamp and the optical system and the shutters, and the photoelectric cell can be replaced by a rotating collector, adjusted in such manner that the retarded impulse coming from the input lamp dephasing amplifier connected for this purpose, passes through a blade of the collector, or does not so pass, according as the motor is running too fast or at normal desired speed, or, on the other hand, passes by another blade of the collector if the motor is running too slow. Thus, according to the position assumed by the collector during the time determined by the original retarded current impulse in passing through the input lamp dephasing amplifier, this impulse will result in actuating the too-high speed control relay, or the too-low speed control relay, or will not actuate either relay if the speed is the normal desired speed.

Figure 4:
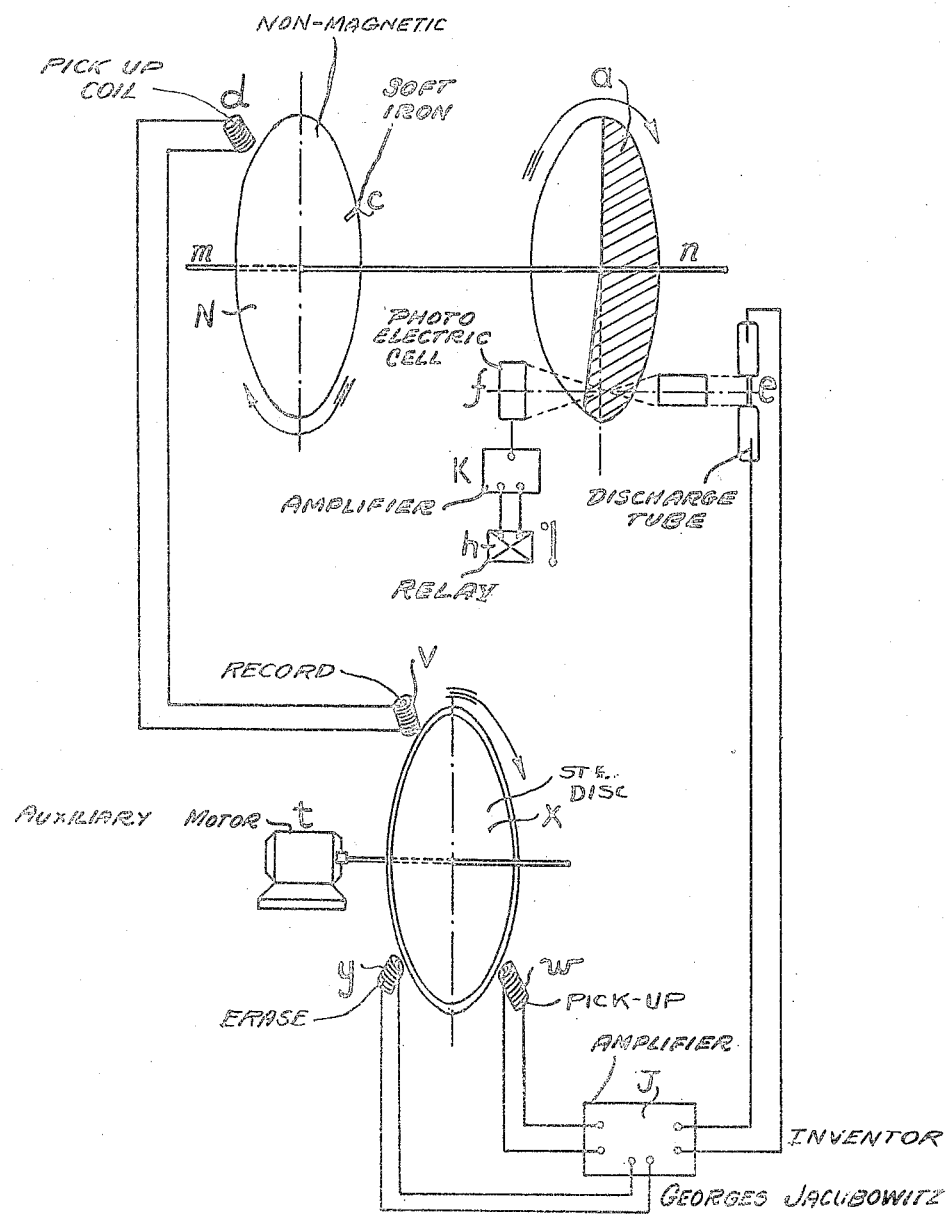
Fig. 4 shows a modified form in which the time delay, instead of being obtained by electrical time delay means, as in Fig. 2, is obtained by electro-magnetically recording the electric impulse and picking it off of a rotating magnetic disc whose speed can be controlled.

Fig. 4 shows an arrangement in which the time delay is obtained by an electro-mechanical assembly using electro-magnetic recording on a rotating magnetic disc. The steel disc $x$ is driven by an independent small motor $t$ at a determined constant speed of rotation, such as a synchronous motor. In a manner analogous to that employed in systems for recording on a steel wire, it is possible to record magnetically on the steel disc $x$ through the winding $v$ of the electro-magnet, the impulse coming from the winding $d$ following the passage of the soft iron insert piece $c$ rotatably driven by the shaft of the motor whose speed is to be controlled, the windings $d$ and $v$ being connected together electrically, either directly or through an amplifier. This current impulse, recorded magnetically on the steel disc $x$, will give with a certain determined time delay an electric impulse by induction in the pick-up winding $w$, the duration of the time delay being a function of the speed of the independent small motor $t$, and of the angle of the spacing on the circumference of the steel disc $x$ of the windings $v$ and $w$. This electric impulse so induced in the pick-up winding $w$ is then amplified by amplifier $J$ and transmitted to the discharge tube $e$, which will give an instantaneous flash of light. This instantaneous flash is employed, as has been previously described, to operate the amplifier of the first photo-electric cell $f$ and the first control relay $h$ through the first shutter $a$ which is driven by the motor shaft whose speed is to be controlled, if an on-off regulation is being made, or, on the other hand, the amplifiers of the two photo-electric cells and the control relays through the two shutters, if a three-mode regulation is being made, and that in a manner which is identical to that described above for Fig. 2. A winding of an erasing electro-magnet $y$ wipes out the magnetic trace recorded on the steel disc $x$, this erasing winding $y$ being spaced following the pick-up winding $w$. It will be understood that in the described systems, the shaft $mn$ can be driven by the motor through intermediate speed reducers or speed multipliers.

Figure 5:
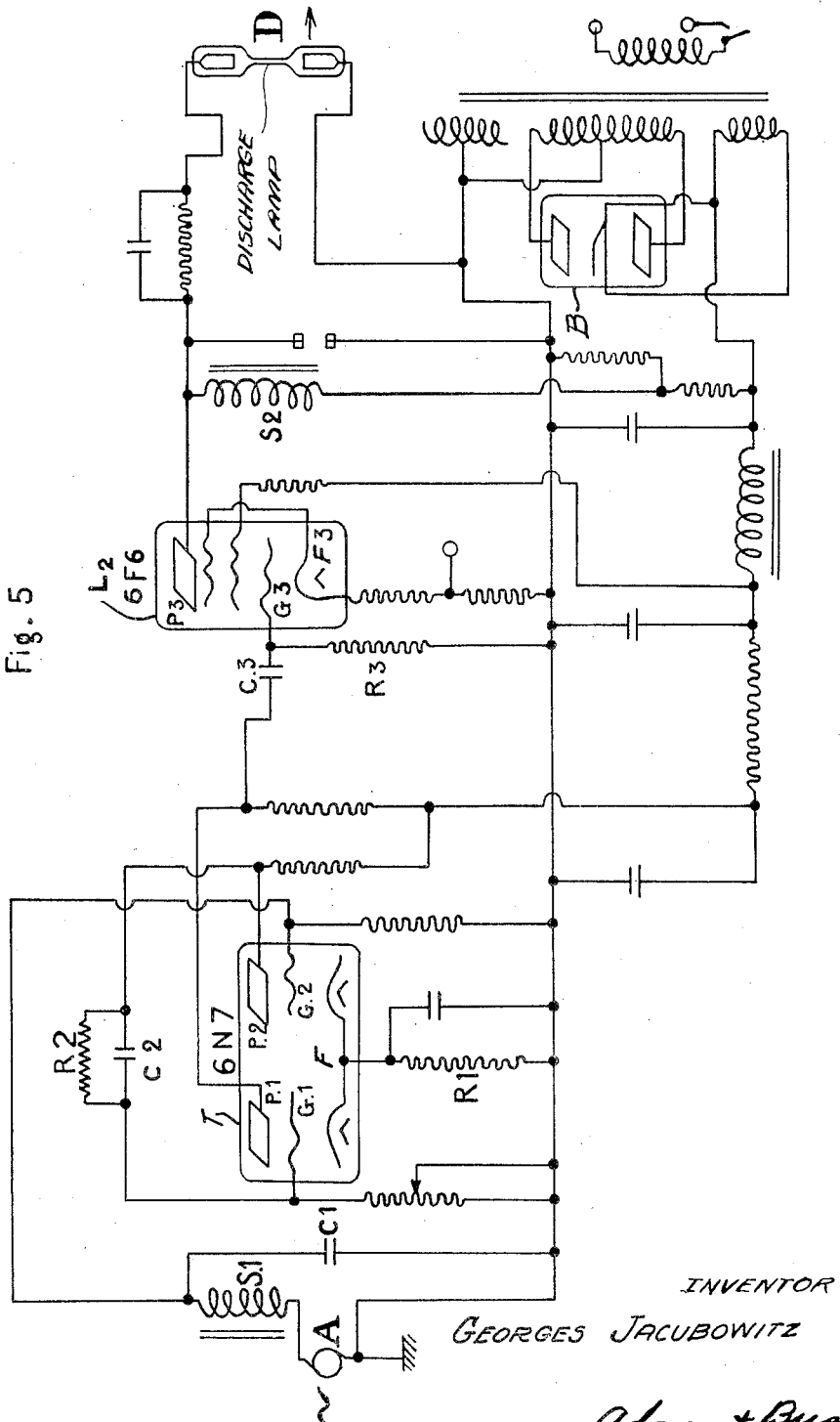
Fig. 5 shows an electronic circuit arrangement supplied by an alternator for providing the time delay of the lamp ignition.

Fig. 5 shows a modified form of embodiment of the present invention wherein an alternator A, mounted on the same drive shaft of the motor whose speed is to be regulated, as the above described two shutters of Fig. 2, delivers its output to a circuit which comprises an inductance S1 and a condenser C1 connected in series and which circuit is in resonance, or nearly in resonance, with a frequency of the alternator A for the alternator frequency corresponding to the desired regulated speed of the motor to be regulated. The voltage across the terminals of the condenser C1 hence will be dephased ahead of or behind with relation to the voltage of the alternator A by an angle of determined magnitude, according to the frequency of the current delivered, and according to the speed of the motor.

This voltage across the condenser C1 whose dephasing with respect to the alternator A varies according to the motor speed, is applied to the grid G2 of a double triode T connected in the following manner. The two component triodes of the double triode T are coupled together by reason of the fact that the return resistance R1 of the cathode F is common to the two component triodes. The plate P2 of the second triode is coupled to the grid G1 of the first triode by a condenser C2 shunted by a resistor R2 of high resistance. The values of these resistances and condensers are such that the circuit normally cannot freely oscillate, while the incidence of an alternating voltage upon the grid G2 will cause the forced blocking and unblocking of the first triode P1, G1, F, upon each cycle. The plate P1 is coupled through the capacity C3 and the resistance R3 to the grid G3 of the pentode tube L2, the circuit C3, R3, having a small time constant. There is thus applied on the control grid G3 of the tube L2 upon each cycle, that is to say, upon each revolution of the alternator, a short negative impulse dephased by an angle of determined magnitude, ahead of or behind, according to the speed of the alternator A.

With further reference to Fig. 5, the pentode tube L2 has in its plate circuit P3 a large inductance S2. Because of the very considerable diminution of the plate current, that is to say of the current in the inductance S2, upon each negative impulse, the voltage across the terminals of the inductance S2 increases considerably at the instant of this diminution of current, and as soon as this voltage attains the value of the ignition voltage of the gas discharge lamp D, the latter ignites, and the inductance S2 discharges through this discharge tube D, causing an instantaneous flash of light. Under these conditions, the instantaneous flash of light coming from the discharge lamp D is displaced with relation to the voltage of the alternator A by an interval of time, which depends upon the speed of the motor. As has been above explained, this instantaneous flash of light is applied to the too-low speed photo-electric cell, or to the too-high speed photo-electric cell, or may not be applied to either photo-electric cell, according to the position of the shutters at the instant of the production of this flash by the discharge lamp.

Figure 6:
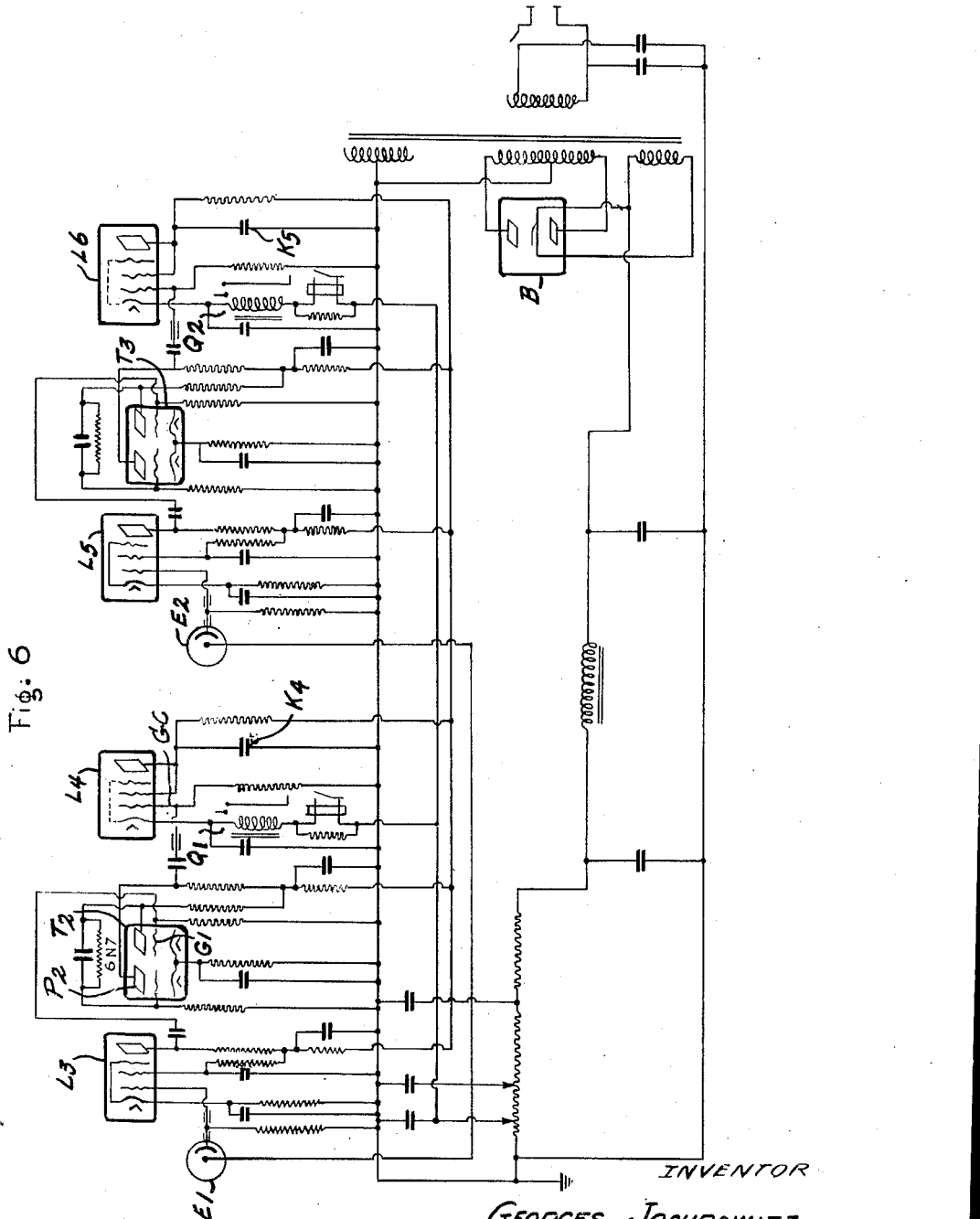
Fig. 6 is a diagram of the electronic circuits connected between the photo-electric cells and the output relays of the system of Fig. 5.

The amplifier of the relay controlled by the photo-electric cells and intended to control the control member acting on the speed of the motor to be regulated, can be provided according to the arrangement of Fig. 6.

In Fig. 6, the instantaneous flash of light is transformed into an electric impulse by the photo-electric cell $E_1$. This impulse is amplified by a pentode L3 in a known manner and is then applied to the grid G1 of a double triode T2 whose component triodes are arranged in balanced relation by the coupling of the one to the other in such manner that the brief impulse at the input of the grid G1 transforms itself by a positive impulse of considerably longer duration on the control grid GC of a succeeding tube L4 which is coupled by a condenser with the plate P2 of the double triode T2. The relay $2_1$ is placed in the return connection of the cathode of the tube L4 and the grid bias of this tube L4 is sufficiently negative so that the relay $2_1$ will normally be in released position. The reception of the long positive impulse on the grid GC of this tube causes an increase in the output during a sufficiently long time to actuate the relay $2_1$, the latter is retarded upon release by a condenser $K_4$ in parallel with the winding of the relay $2_1$ in such manner that it cannot release again during the time which exists between two impulses. The controlled contact of the relay $2_1$ is available to control any suitable members acting on the speed of the motor to apply the necessary correction thereto.

The second circuit comprising photo-electric cell $E_2$ and a relay $2_2$ is identical with the corresponding first ones. The photo-electric cell $E_1$ and the relay $2_1$ can control the operation for too-low speed, for example, and the photo-electric cell E₂ and the relay 2₂ can control the operation for too-high speed, and this according to their position with relation to the shutters.

The two relays 2₁ and 2₂ have a mechanical interlocking bar which prevents them from both being closed at the same time.

The arrangement which has been described is given as an illustrative embodiment and it is apparent that there can be arranged other electronic circuits producing the result sought. For example, other circuits than those described can be employed to dephase the current, just like the thyratron lamps, to obtain the instantaneous ignition of the discharge lamp, or to actuate the relays.

It will be apparent to those skilled in the art that my invention is susceptible of modifications to adapt the same to particular conditions, and all such modifications which are within the scope of the appended claims I consider to be comprehended within the spirit of my invention.

Having thus described the invention, what is claimed is:

1. In a constant speed motor control system, a motor, a shaft driven by said motor, a pair of shutters fixedly carried by said shaft in axially spaced relation, each of said shutters having an opaque sector and an open light transmitting sector, said shutters being set on said shaft in such manner as to have a relatively small common sectoral area of overlap of their respective opaque sectors, an inertialess ignition discharge lamp positioned between said shutters, a pair of photo-electric cells respectively positioned adjacent said shutters on the sides thereof remote from said lamp and in the path of a beam from said lamp through said open sector of said shutters respectively to said cells, electric impulse generating means comprising an element driven by said shaft and adapted to deliver an instantaneous electric impulse cyclically once during each revolution of said shaft, a connection comprising adjustable time delay means connected between said impulse generating means and said lamp, individual amplifiers for amplifying the outputs of said photo-electric cells respectively, a pair of relays respectively connected to the outputs of said amplifiers, interlocking means interconnecting the armatures of said relays and preventing the armatures of said relays from both being closed at the same time, said motor comprising means for selectively increasing its speed and means for decreasing its speed, connections from the controlled output of a first said relay to said speed increasing means, and connections from the controlled output of said second relay to said speed decreasing means.

2. A system according to claim 1, said electric impulse generating means comprising a non-magnetic disc fixedly carried by said shaft, a small ferro-magnetic piece inserted in the periphery of said disc, and a pick-up coil fixedly mounted adjacent said disc in magnetic linkage relation with said ferro-magnetic piece as the rotation of said disc carries said piece past said coil.

3. A system according to claim 1, said time delay means comprising electrical circuit time delay means.

4. A system according to claim 1, said time delay means comprising a magnetic sound recording disc tablet, adjustable speed drive means for rotating said tablet at a desired speed, a recording head having its input connected to said impulse generating means and being in magnetic relation with said tablet, a reproducing head in magnetic relation with said tablet and being peripherally adjustably substantially spaced from said recording head and in magnetic relation with said tablet, and the output of said reproducing head being connected with said lamp.

5. A system according to claim 1, said electric impulse generating means comprising an alternator driven by said shaft, and an electric impulse producing network including a condenser connected to the output of said alternator.

GEORGES JACUBOWITZ.

No references cited.